United States Patent Office 3,476,375
Patented Nov. 4, 1969

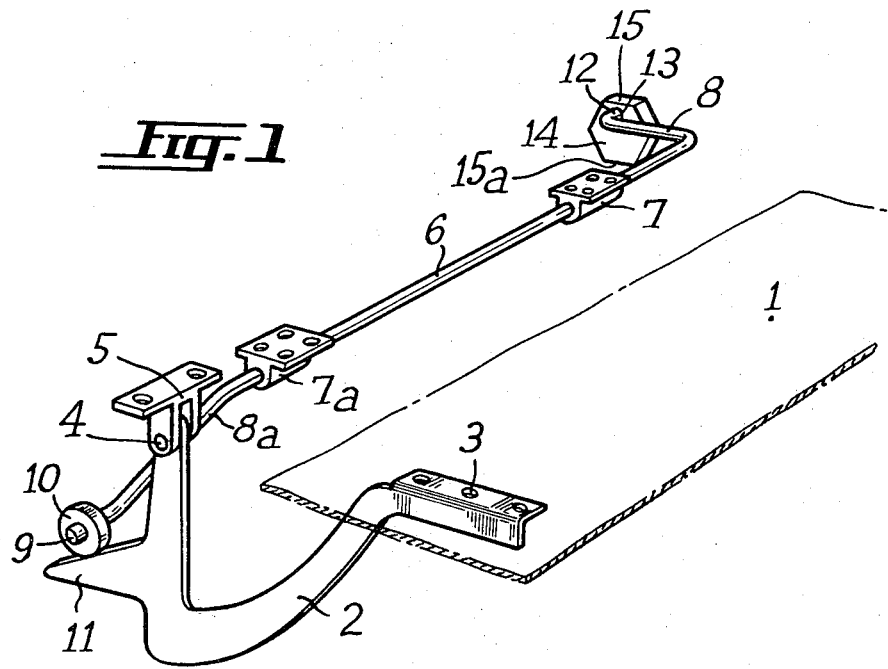
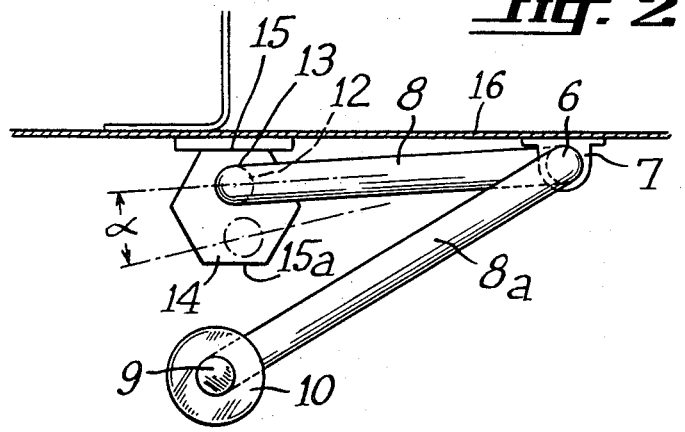

3,476,375
TORSION BAR ADJUSTING DEVICE
Jacques Brasseur, Saint-Germain-en-Laye, France, assignor to Société Anonyme dite: Société des Automobiles Simca, Paris, France
Filed Jan. 2, 1968, Ser. No. 695,088
Claims priority, application France, Jan. 17, 1967, 91,459
Int. Cl. E05f 1/12; F16f 1/16; B62d 25/12
U.S. Cl. 267—57                              4 Claims

ABSTRACT OF THE DISCLOSURE

A torsion adjusting device for torsion bar controlling the movement of a hinged element including bearing means in which the bar is supported by bearings fixed to the structure and has perpendicular arms formed at each of its ends. One of the arms is arranged to apply the torsion of the bar to at least one hinged element to urge it in a given direction and the other arm has a right angled portion extending into and engaging with an eccentric hole formed in a polygonal adjusting element which has one of its faces bearing against a portion of the structure whereby the torsion of the bar may be adjusted by turning the polygonal element so that a different one of the polygonal faces bears against the structure.

---

The present invention relates to a device for adjusting the torsion of a torsion bar used to control the movement of a hinged element and particularly the boot lid of a vehicle.

Boot lids for vehicles very often comprise a resilient member constituted particularly by a torsion bar which urges the lid towards its open position when the catch is actuated to unlock the lid.

In the case of a torsion bar, the later acts by one of its ends on a member rigid with the lid, particularly one of the hinges, the other end of the bar being fixed with respect to a fixed part and particularly the body of the vehicle.

It is sometimes necessary however to adjust the tension of the bar, particularly by displacing the anchored end in holes provided on a part rigid with the fixed part.

The main object of the present invention is to provide a simple device enabling a torsion bar to be adjusted by a simple movement of a member having a polygonal contour in which is eccentrically engaged the anchored end of the bar.

According to the invention, a device for adjusting the torsion in a torsion bar controlling the movement of an element hinged on a fixed structure is characterised in that the torsion bar is supported by bearings fixed to the said structure and has at each of its ends an arm perpendicular to the bar, one of the arms being arranged to apply the torsion of the bar to the hinged element to urge it in a given direction, and the other arm having a portion extending outwardly at right angles thereto, said portion engaging in an eccentric hole in a polygonal element, one of the polygonal faces of which bears against a portion of said structure, whereby the torsion in the bar may be adjusted by turning said polygonal element so that a different one of its polygonal faces is applied against the structure.

There results from this a great simplicity as regards mounting the device on a vehicle, the polygonally contoured member being simply applied by one of its polygonal faces against one of the walls of the boot or of the vehicle under the resilient action of the bar.

Moreover, by increasing the number of faces of the polygonal contour, a greater range of adjustments can be obtained.

In order that the invention may be more fully understood, one embodiment in accordance therewith will now be described, by way of example, with reference to the accompanying drawings in which:

FIG. 1 is a perspective view of a boot lid and of its manner of connection with a torsion bar.

FIG. 2 is a lateral elevation of the adjustment device of the invention.

In FIG. 1, there is partially shown a lid 1 for the boot of a vehicle, fixed by means of screws one of which is shown at 3, on hinges of which a single one is shown at 2 in the drawing. The hinges are swan-necked and are pivoted in known manner by a spindle 4 on brackets 5 fixed to the vehicle body.

A torsion bar 6 mounted in bearings 7, 7a fixed to a part of the vehicle body and extending transversally of the longitudinal axis of the vehicle, includes at each of its ends an arm 8, 8a bent perpendicularly to the axis of the bar.

The arm 8a is bent at its end so as to constitute a spindle 9 on which is rotatably mounted a roller 10, by means of which the arm bears upon a projecting runner 11 rigid with one of the hinges 2 and disposed symmetrically at the fixing point of the lid with respect to the pivotal axis 4.

The arm 8 is bent perpendicularly at its extremity in order to constitute a finger 12 which is freely mounted for rotation in an eccentric hole 13 of a member 14 constituted by a plate having a hexagonal contour in the example shown in the drawing.

The member 14, subjected to the action of the torsion bar 6, bears by means of one of its faces such as 15 against a fixed wall of the vehicle body, as for example the sheet metal wall represented at 16.

The torsion bar 6 being anchored on a fixed part of the vehicle by its bearing 7 and being applied by its arm 8 by means of the member 14 against the wall 16, acts through its arm 8a on the track 11 of the hinge 2 so as to urge the lid 1 towards its open position.

Adjustment of the tension of the bar 6 can be effected by turning the member 14 about the finger 12 in order to bring another face 15a of the polygonal contour into contact with the fixed wall 16.

By reason of the eccentricity of the hole 13, there is obtained, in relation to the face 15 in contact with the wall 16, a movement of the finger 12 which corresponds to the angle alpha ($\alpha$) which represents the adjustment of the tension of the bar.

Although a member having a hexagonal contour is represented in the drawing, it is possible to use any other polygonal contour according to the range of variation of adjustment desired.

It is moreover possible, with such a device to use a series of members 14 having different eccentricities and different forms which enable the adjustment to be easily varied within a wide range.

What is claimed is:

1. A device for adjusting the torsion in a torsion bar controlling the movement of an element hinged on a fixed structure comprising: bearing means fixed to said structure supporting said bar; an arm formed perpendicularly on each end of said bar, at least one hinge and one of the arms being arranged to apply the torsion of the bar to the hinged element to urge it in a given direction; the other arm having a portion extending outwardly at right angles thereto; a polygonal adjusting element having an eccentric hole formed therein; said right angle portion being engaged in said eccentric hole; and one of the polygonal faces of said polygonal element bearing against a portion of the structure whereby the torsion of the bar may be adjusted by turning said polygonal element so that a different one of its polygonal faces is applied against the structure.

2. A device according to claim 1 characterized in that said one of said arms is applied against a track on a hinge of said element disposed symmetrically with respect to the hinge axis of said element, a roller being mounted on said one arm of said bar, which roller bears on said track to apply the torsion of the bar to the element.

3. A device according to claim 1 wherein the hinged element is the boot lid of a vehicle, the structure being the vehicle body to which the torsion bar is transversely disposed.

4. The device of claim 1 wherein said polygonal element is a hexagon.

References Cited

UNITED STATES PATENTS

| | | | |
|---|---|---|---|
| 2,811,347 | 10/1957 | Cass | 267—57 |
| 3,339,969 | 9/1967 | Bridle et al. | 296—76 |

JAMES B. MARBERT, Primary Examiner

U.S. Cl. X.R.

16—180; 296—76